United States Patent [19]

Marx

[11] 4,342,447
[45] Aug. 3, 1982

[54] GAS SPRING WITH TUBULAR SHELL SEAL

[75] Inventor: Thomas O. Marx, Rockton, Ill.

[73] Assignee: Atwood Vacuum Machine Company, Rockford, Ill.

[21] Appl. No.: 180,623

[22] Filed: Aug. 25, 1980

[51] Int. Cl.³ .............................................. F16F 9/04
[52] U.S. Cl. .................................. 267/64.23; 188/298; 188/315; 188/322.17; 267/122; 277/3; 277/27
[58] Field of Search .................... 188/298, 322.17, 314, 188/322.21, 315; 267/64.19, 64.23, 64.27, 64.11, 122, 126; 277/3, 27; 92/168

[56] References Cited

U.S. PATENT DOCUMENTS

| 3,415,162 | 12/1968 | Willis et al. | 92/168 X |
| 3,750,855 | 8/1973 | Peddinghaus | 188/314 X |
| 3,865,356 | 2/1975 | Wossner | 267/64.11 X |
| 4,005,769 | 2/1977 | Itoh | 188/322.17 X |
| 4,044,866 | 8/1977 | Ishida | 188/322.17 X |
| 4,079,925 | 3/1978 | Salin | 267/129 |
| 4,108,423 | 8/1978 | Skubal | 267/64 R |
| 4,189,033 | 2/1980 | Katsumori | 188/315 X |

FOREIGN PATENT DOCUMENTS

| 1006276 | 4/1957 | Fed. Rep. of Germany | 188/315 |
| 1245224 | 7/1967 | Fed. Rep. of Germany | 188/315 |
| 2122966 | 11/1972 | Fed. Rep. of Germany | 188/322.17 |
| 2311201 | 10/1977 | Fed. Rep. of Germany | 267/64.23 |

Primary Examiner—George E. A. Halvosa
Attorney, Agent, or Firm—Leydig, Voit, Osann, Mayer & Holt, Ltd.

[57] ABSTRACT

A gas spring comprises a piston assembly slidable in a cylinder closed at one end and open at the other with a rod connected to the piston assembly and projecting through the open end of the cylinder. This open end is sealed by a sealing assembly and the interior of the cylinder contains a body of oil and a gas under pressure. The sealing assembly includes a shell of resilient material with one annular portion in sealing engagement with the rod, a second annular portion in sealing engagement with the inner wall of the cylinder, and a cavity containing a reservoir of oil. When the pressure in the cavity is less than the pressure in the cylinder, the inner portion of the shell collapses and, when the pressure differential is reversed, the inner end of the shell opens to permit oil to flow from the cavity to the cylinder. In either case, however, the action of the shell is such as to maintain the sealing action of each annular portion of the shell.

11 Claims, 10 Drawing Figures

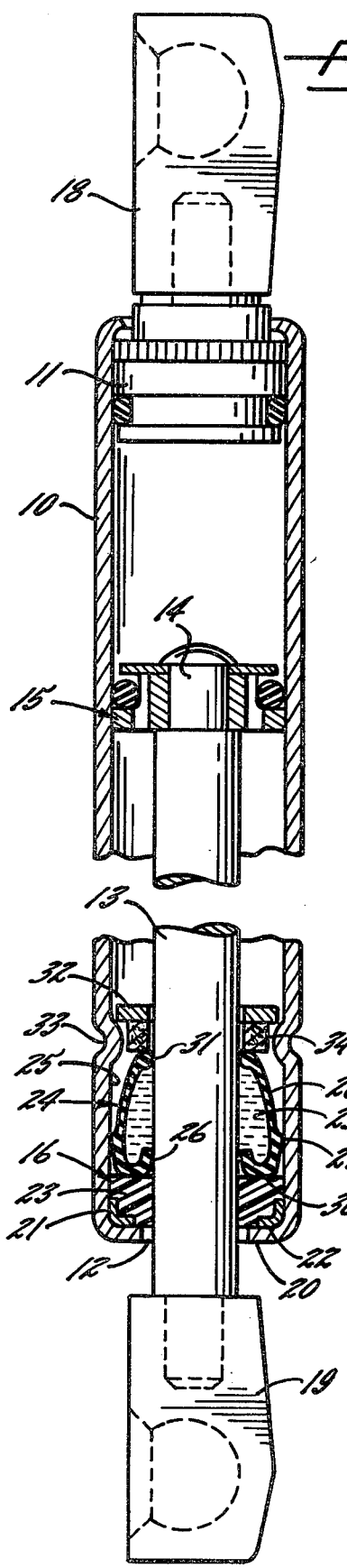
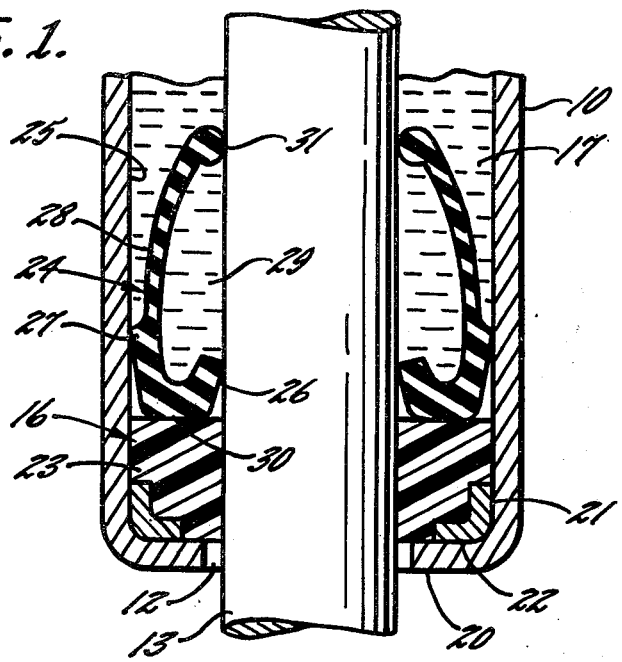
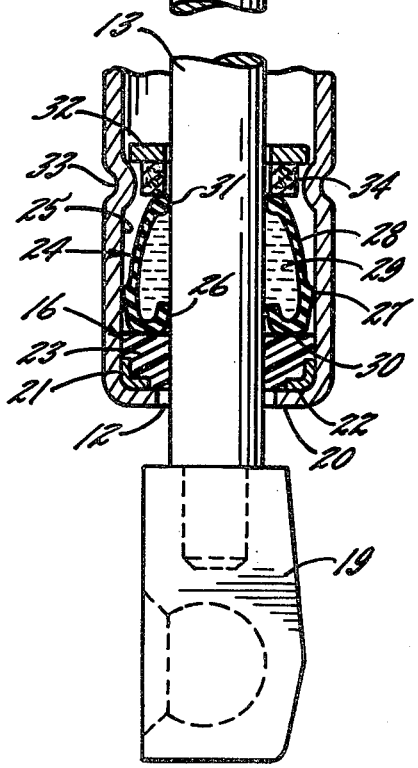
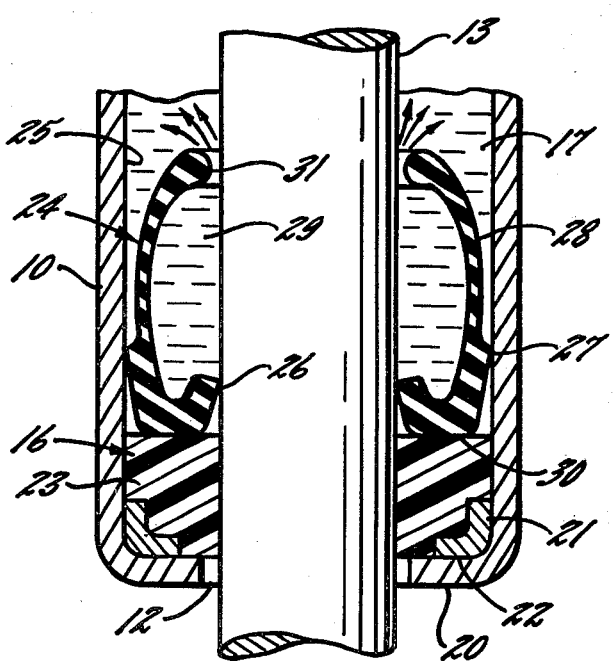

GAS SPRING WITH TUBULAR SHELL SEAL

BACKGROUND OF THE INVENTION

This invention relates to a gas spring of the type in which a piston assembly reciprocates in an elongated cylinder closed at one end and open at the other with a rod connected to the piston assembly and projecting through the open end of the cylinder. The cylinder is sealed at its open end by a sealing assembly which seals the space between the rod and the inner wall of the cylinder while permitting the rod to reciprocate with the piston assembly. Inside the cylinder is a body of oil and a gas under pressure. The invention has more particular reference to a gas spring wherein the sealing assembly also serves as a reservoir of oil for the cylinder. An example of such a gas spring is shown in Skubal U.S. Pat. No. 4,108,423.

SUMMARY OF THE INVENTION

The general object of the invention is to provide a sealing assembly with a new and improved sealing member which is comparatively simple and inexpensive in construction, which provides a good seal regardless of variations in pressure in the space between the sealing assembly and the piston assembly and which, at the same time, provides the reservoir for the oil.

A more detailed object is to form the sealing member as a resilient tubular shell which has a cavity to serve as the oil reservoir and which has an annulus in sealing engagement with the rod and a second annulus in sealing engagement with the inner wall of the cylinder and to construct the shell in a novel manner so that each annulus retains its sealing engagement regardless of any pressure differential between the cavity and the cylinder.

The invention also resides in the arrangement by which the cavity is filled with the proper amount of oil at least once during each stroke of the piston assembly and in the novel details of construction of the illustrated embodiments of the invention.

BRIEF DESCRIPTION OF THE DRAWINGS

FIG. 1 is a fragmentary longitudinal sectional view of a gas spring incorporating my invention.

FIG. 2 is an enlarged fragmentary longitudinal sectional view of the gas spring illustrated in FIG. 1 with the sealing member in its normal position.

FIG. 3 is a fragmentary sectional view similar to FIG. 2 but showing the sealing member in a different position.

DETAILED DESCRIPTION OF THE PREFERRED EMBODIMENTS

Figure 4:
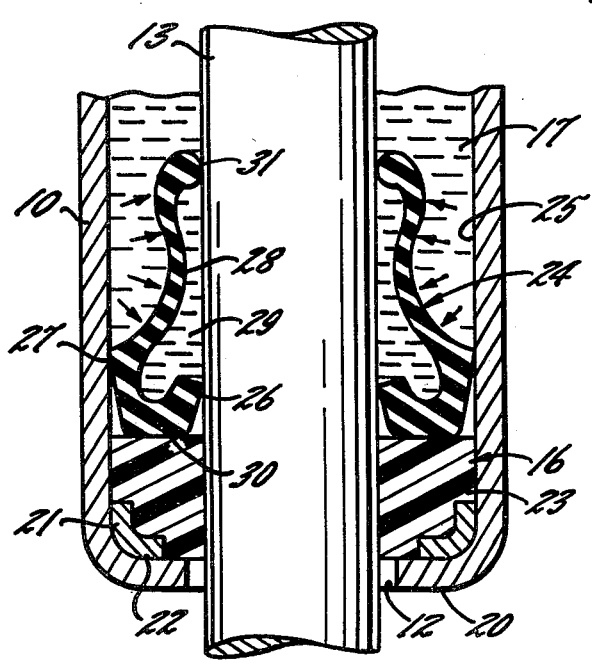
FIG. 4 is a fragmentary sectional view similar to FIG. 2 but showing the sealing member in a different position.
Figure 5:
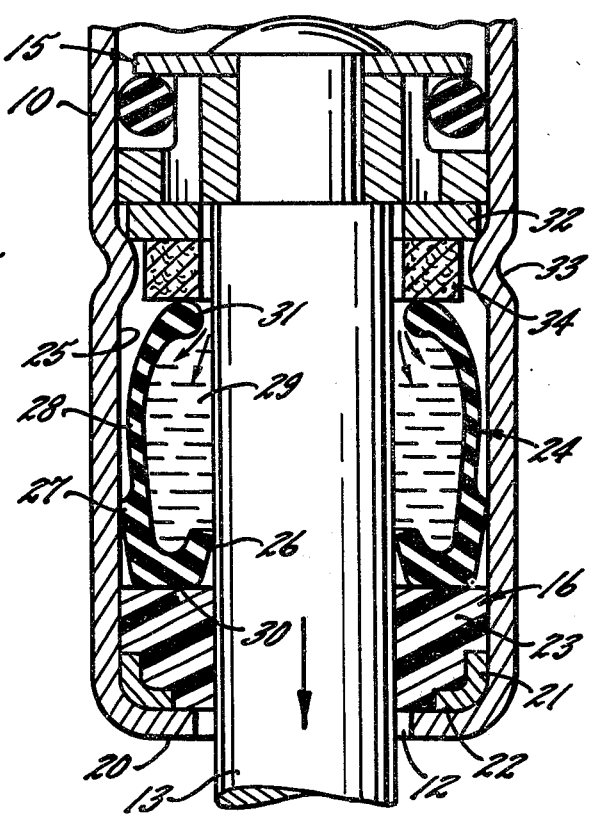
FIG. 5 is a fragmentary sectional view similar to FIG. 2 but showing the sealing member in a different position.

As shown in the drawings for purposes of illustration, the invention is embodied in a gas spring of the type conventionally used to hold open a deck lid, a hatch back or the like of an automotive vehicle. The gas spring includes an elongated hollow cylinder 10 closed at one end by a plug 11 and open at the other or rod end as indicated at 12 with an elongated rod 13, which is coaxial with the cylinder, projecting through the open end. At its inner end portion 14, the rod is reduced in diameter and this portion of the rod carries a piston assembly 15 which is slidable in the cylinder and may be of any conventional construction such as shown in Skubal U.S. Pat. No. 4,108,423. The open end 12 of the cylinder is sealed by a sealing assembly 16 disposed within the cylinder adjacent the open end 12 thereof and surrounding the rod 13, the assembly being in sealing engagement with the rod while permitting the latter to reciprocate with the piston assembly. As is customary in gas springs, the interior of the cylinder contains a quantity of oil 17 and gas under pressure, the gas usually being an inert gas such as nitrogen. Conventional connectors 18 and 19 are secured respectively to the closed end of the cylinder and to the outer end of the rod.

Herein, the sealing assembly 16 is held in the cylinder 10 by an inturned flange 20 formed on the cylinder adjacent the open end 12 and the assembly includes a short tube 21 having a radial flange 22 abutting the flange 20. A ring 23 made of a rigid material such as plastic or steel is seated in the tube and supports the rod 13. A sealing member 24 is supported by the ring 23 and is in sealing engagement with both the rod and the inner wall 25 of the cylinder thereby sealing the open end of the cylinder.

In accordance with the present invention, the sealing member 24 is constructed in a novel manner so that it is simple and inexpensive, provides a good seal against the rod 13 and the wall 25 regardless of variations in pressure in the space between the sealing assembly 16 and the piston assembly 15, and serves as a reservoir of oil 17 for the gas spring. To these ends, the sealing member is a tubular shell or bladder surrounding the rod 13 with an annulus 26 at its outer end in sealing engagement with the rod. A second annulus 27 formed on the wall 28 of the shell 24 is in sealing engagement with the cylinder wall 25 and thus the annulus 26 and the annulus 27 cooperate to seal the open end 12 of the cylinder 10. The inner end of the shell normally engages the rod whereby the shell forms a cavity 29 which is filled with at least a portion of the body of oil 17. The wall 28 is thinner in cross section than the annulus 27 and thus, if the pressure outside the shell is greater than the pressure inside, the wall tends to collapse and equalize the pressure inside thereby maintaining a force of the annulus 27 against the cylinder wall 25. On the other hand, if the pressure differential is reversed, the pressure inside holds the annulus 27 against the wall 25 while oil flows out of the cavity 29 through the upper end of the shell 24. In either case, the pressure in the cavity also holds the annulus 26 against the rod 13.

In the form shown in FIGS. 1 through 5, the shell 24 is molded as a unitary piece with an outer end portion 30 abutting the ring 23. The end portion 30 is annular but narrower than the distance between the rod 13 and the cylinder wall 25 so as to be spaced from both. The annulus 26 is a flange projecting inwardly and toward the rod from the end portion 30 so that pressure in the cavity urges the flange against the rod. The other annulus 27 extends from the outer side of the end portion 30 and projects radially outwardly and toward the wall 25 to bear against the latter. The wall 28 of the shell 24 is a continuation of the annulus 27 but is appreciably thinner in cross section and this wall curves gradually toward the rod 13. Formed on the upper end of the wall 28 is an annular rib 31 which normally engages the rod. The natural size of the shell 24 is such that openings provided by the rib 31 and the flange 26 are somewhat smaller than the diameter of the rod 13 so that, even in the absence of any pressure on the shell, these parts bear against the rod. Also, the natural diameter of the annulus 27 is somewhat larger than the inside diameter of the cylinder 10 so that the annulus bears against the cylinder wall 25. As shown in FIG. 2, these conditions prevail when the cavity 29 is filled with oil and there is oil in the cylinder but there is essentially no pressure differential between the inside and outside of the shell.

If, as shown in FIG. 3, the pressure in the cavity 29 exceeds the pressure in the cylinder 10, the pressure differential will force the rib 31 away from the rod 13 due to the thin section of the shell wall 28 and, as a result, oil flows out of the cavity as indicated by the arrows until the pressures are equalized. During this, the resiliency of the shell and the pressure inside hold the flange 26 against the rod and the annulus 27 against the cylinder wall 25. On the other hand, if the pressure outside the shell is greater than the pressure in the cavity 29, this pressure differential will collapse the shell wall 28 as indicated by the arrows in FIG. 4 until the two pressures are equalized. Because the section of the wall 28 is thinner than the section of the annulus 27, however, the annulus does not collapse. Instead, the pressure increase in the cavity caused by the collapse of the wall 28 urges the annulus 27 more firmly against the cylinder wall 25 and similarly urges the flange 26 against the rod 13. While these changes in pressure differential may result from a variety of reasons, they usually are caused by the reciprocation of the piston assembly 15 in the cylinder 10.

As is customary in many gas springs, a stop washer 32 is loosely received on the rod 13 above the sealing assembly 16 and its outward movement is limited by engagement with an indentation 33 in the cylinder 10. Thus, as the piston assembly 15 moves toward the open end 12 of the cylinder 10, it engages the washer 32 and, when the washer abuts the indentation 33, the movement of the piston assembly and the washer stops and this limits the outward stroke of the piston assembly and the rod. In the form of the invention shown in FIGS. 1 through 5, this action of the stop washer 32 is utilized to refill the cavity 29 with oil if the shell previously has been collapsed. To this end, a ring 34 smaller in diameter than the diameter of the cylinder at the indentation 33 is secured to the underside of the stop washer 32 so that, through this ring, the washer normally rests on the shell 24 while being spaced above the indentation as illustrated in FIG. 1. When the piston assembly 15 reaches the limit of its outward stroke (see FIG. 5), the ring 34 pushes against the top of the shell 24 and spreads the rib 31 away from the rod 13. As a result, oil is forced into the cavity 29 as illustrated by the arrows in FIG. 5 and this restores the shell 24 to the normal condition shown in FIG. 2.

Figure 6:
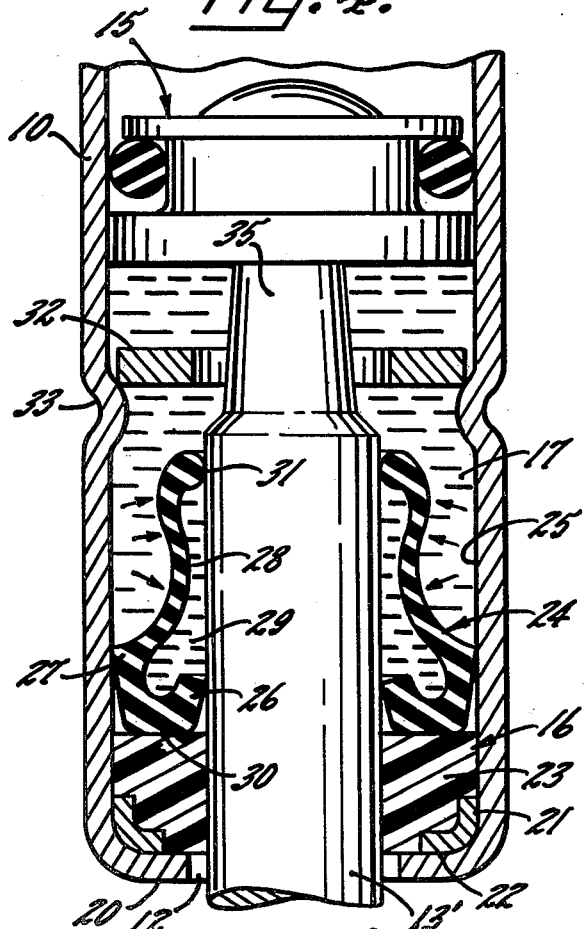
FIG. 6 is a view similar to FIG. 5 but illustrating a modified form of the invention.
Figure 7:
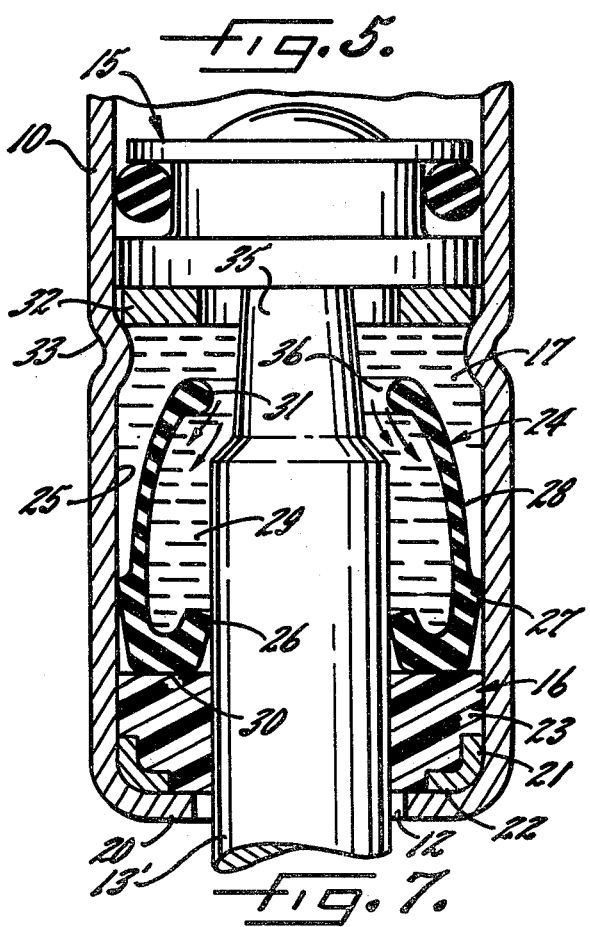
FIG. 7 is a view similar to FIG. 6 showing the parts in a moved position.

In the modified form of the invention shown in FIGS. 6 and 7, the construction of the elements is the same except that the ring 34 on the stop washer 32 is eliminated and the rod 13' is formed in a novel manner to permit oil to enter the cavity 29 as the piston assembly 15 reaches the end of its outward stroke. To this end, the portion 35 of the rod 13' is reduced in diameter, preferably being tapered slightly, so that the diameter of this portion is smaller than the natural diameter of the rib 31 on the inner end of the shell 24. Thus, the stop washer normally rests on the indentation 33 and the shell 24 functions in response to pressure differentials in the same way as in the form of FIGS. 1 through 5 with the rib 31 normally engaging the main portion of the rod. If, however, the wall 28 of the shell is collapsed on the outward stroke of the piston assembly 15 as illustrated in FIG. 6, the reduced portion 35 of the rod 13' passes through the rib 31 leaving a space 36 (FIG. 7) between this reduced portion and the rib. Because the pressure in the cylinder 10 is greater than the pressure in the cavity at this time, oil flows from the cylinder into the cavity as shown by the arrows in FIG. 7 and the shell 24 returns to its natural shape for the return stroke of the piston assembly.

Figure 8:
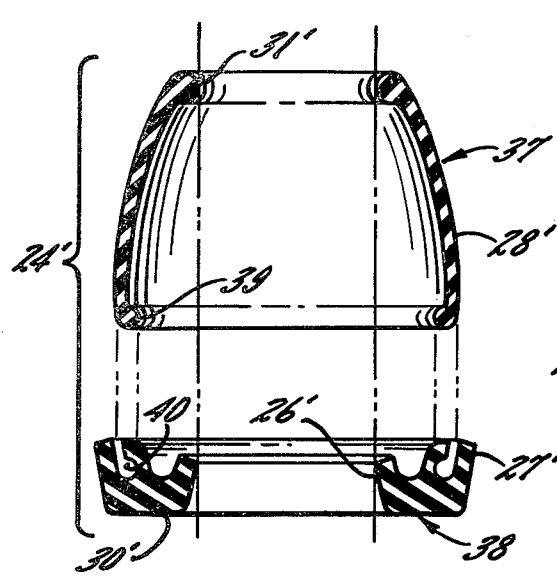
FIG. 8 is an exploded longitudinal sectional view of a modification of the sealing member.
Figure 9:
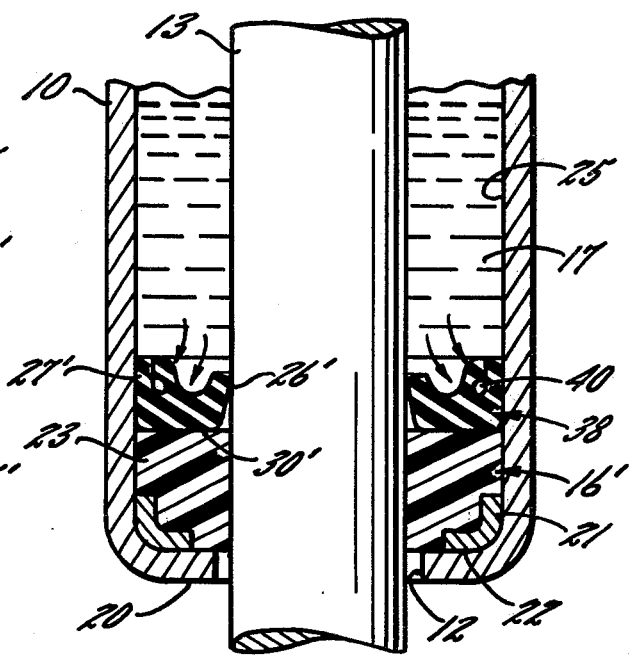
FIG. 9 is a fragmentary sectional view similar to FIG. 2 but showing one application of the sealing member of FIG. 8.
Figure 10:
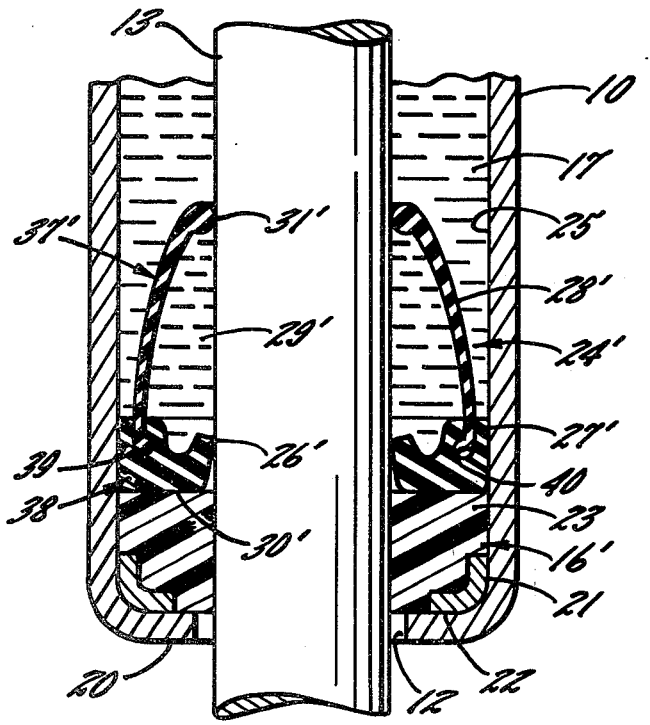
FIG. 10 is a fragmentary sectional view similar to FIG. 2 but showing another application of the sealing member of FIG. 8.

In the modification shown in FIGS. 8, 9 and 10, the construction is basically the same as that shown in FIGS. 1 through 5 except that the shell 24' is made in two connectable parts 37 and 38 to give the option of having both the seal and the reservoir cavity 29' or just the seal. Thus, the part 38 constitutes the annulus 27', the flange or annulus 26' and the bottom portion 30' of the shell while the part 37 includes the wall 28' and the rib 31'. To connect the parts, the part 37 has a rounded inwardly turned flange 39 on the lower end of the wall 28' and the annulus 27' has a complementary shaped annular recess 40 to receive the flange 39 and the adjacent portion of the shell wall 28'. With this arrangement, the parts 37 and 38 may be snapped together as shown in FIG. 10 and the two parts form a shell which functions in the same manner as in either of the previous two embodiments. On the other hand, the part 37 may be eliminated as illustrated in FIG. 9 in which case, the pressure in the cylinder 10 urges the annulus 27' against the cylinder wall 25 and the flange 26' against the rod 13 to effectively seal the open or rod end of the cylinder 10.

It will be observed that the shell 24 provides an effective yet inexpensive seal for the rod or open end of the cylinder 10. At the same time, it serves as a reservoir of oil for the cylinder while maintaining the integrity of the seal irrespective of pressure differentials between the cylinder and the cavity 29 of the shell.

I claim:

1. In a gas spring having a cylinder open at one end and closed at the other end, a piston slidable in said cylinder, a rod fixed to said piston and projecting out of said cylinder through the open end thereof, and a body of oil and a gas under pressure in said cylinder, the combination of, a rigid annulus disposed in said cylinder adjacent said open end thereof and encircling said rod, a tubular shell located between said closed end and said rigid annulus and having an outer generally annular end portion abutting said annulus and an inner end surrounding said rod with a generally cylindrical wall connecting said outer end portion and inner end, said shell being made of a flexible and resilient material, a first annular portion formed on said outer end portion of said shell adjacent said rod and extending around the entire inner periphery of said outer end portion, said first annular portion resiliently engaging said rod around the entire circumference thereof to form a seal between the shell and the rod, and a second annular portion formed on the exterior of said shell around the entire outer periphery of said outer end portion and engaging the inside of said cylinder around the entire circumference thereof to form a seal between the shell and the cylinder whereby said shell seals the open end of the cylinder, said inner end of said shell normally resiliently engaging said rod around the periphery thereof and said wall of said shell being spaced from said rod whereby the shell and the rod define an annular cavity, said cavity being filled with at least a portion of said body of oil, said wall expanding and contracting in response to differences of the pressures in said cylinder and in said cavity as said piston slides back and forth in the cylinder thereby to pump oil into and out of said cavity between said inner end and said rod and maintain the cavity full of oil.

2. In a gas spring having a cylinder open at one end and closed at the other end, a piston slidable in said cylinder, a rod fixed to said piston and projecting out of said cylinder through the open end thereof, and a body of oil and a gas under pressure in said cylinder, the combination of, a rigid annulus disposed in said cylinder adjacent said open end thereof and encircling said rod, a tubular shell located between said closed end and said rigid annulus and having an outer generally annular end portion abutting said annulus and an inner end portion surrounding said rod with a generally cylindrical wall connecting said outer and inner end portions, said shell being made of a flexible and resilient material, a first annular portion formed on said outer end portion of said shell adjacent said rod and extending around the entire inner periphery of said outer end portion, said first annular portion resiliently engaging said rod around the entire circumference thereof to form a seal between the shell and the rod, and a second annular portion formed on said outer end portion at the exterior of said shell around the entire outer periphery of said outer end portion and engaging the inside of said cylinder around the entire circumference thereof to form a seal between the shell and the cylinder whereby said shell seals the open end of the cylinder, said inner end portion of said shell normally resiliently engaging said rod around the periphery thereof and said wall of said shell being spaced from said rod whereby the shell and the rod define an annular cavity, said cavity being filled with at least a portion of said body of oil, said outer and inner end portions having a thickness greater than the thickness of said wall whereby said wall expands and contracts in response to differences of the pressures in said cylinder and in said cavity as said piston slides back and forth in the cylinder thereby to pump oil into and out of said cavity between said inner end portion and said rod and maintain the cavity full of oil.

3. A gas spring as defined in claim 2 in which said shell is a unitary member.

4. A gas spring as defined in claim 3 in which said first annular portion, said second annular portion and said end portions have a thickness greater than the thickness of said wall of said shell.

5. A gas spring as defined in claim 4 in which said inner end portion of said shell includes an annular rib which normally engages said rod but which moves away from the rod when the pressure in said cavity is greater than the pressure in said cylinder to permit oil to flow from the cavity into the cylinder.

6. A gas spring as defined in claim 2 in which said shell is formed in two parts, said first part including said outer end portion and said first and second annular portions and said second part including the wall of said shell, and means connecting said two parts of said shell.

7. A gas spring as defined in claim 6 in which said part forming said wall includes an annular rib on the inner end of said part, said rib normally engaging said rod.

8. In a gas spring having a cylinder open at one end and closed at the other end, a piston slidable in said cylinder, a rod fixed to said piston and projecting out of said cylinder through the open end thereof, and a body of oil and a gas under pressure in said cylinder, the combination of, a rigid annulus disposed in said cylinder adjacent said open end thereof and encircling said rod, a tubular shell located between said closed end and said rigid annulus and having an outer generally annular end portion abutting said annulus and and inner end surrounding said rod with a generally cylindrical wall connecting said outer end portion and inner end, said shell being made of a flexible and resilient material, a first annular portion formed on said outer end portion of said shell adjacent said rod and extending around the entire inner periphery of said outer end portion, said first annular portion resiliently engaging said rod around the entire circumference thereof to form a seal between the shell and the rod, and a second annular portion formed on the exterior of said shell around the entire outer periphery of said outer end portion and engaging the inside of said cylinder around the entire circumference thereof to form a seal between the shell and the cylinder whereby said shell seals the open end of the cylinder, said inner end of said shell normally resiliently engaging said rod around the periphery thereof and said wall of said shell being spaced from said rod whereby the shell and the rod define an annular cavity, said cavity being filled with at least a portion of said body of oil, said wall expanding and contracting in response to differences of the pressures in said cylinder and in said cavity as said piston slides back and forth in the cylinder thereby to pump oil into and out of said cavity between said inner end and said rod and maintain the cavity full of oil, and means coacting between said piston, said rod and said shell to move the inner end of said shell away from said rod and permit oil to flow from said cylinder into said cavity.

9. A gas spring as defined in claim 8 in which said means includes a part slidable on said rod and abutting said inner end of said shell as said piston approaches the open end of said cylinder thereby to urge said inner end away from said rod and permit oil to flow from said cylinder to said cavity.

10. A gas spring as defined in claim 8 in which said means is the portion of said rod immediately below said piston and said portion is reduced to a diameter less than the normal diameter of the inner end of said shell whereby, as said piston approaches the outer end of said cylinder, said reduced portion of said rod enters said inner end portion of said shell and permits oil to flow from said cylinder to said cavity.

11. In a gas spring having a cylinder open at one end and closed at the other end, a piston slidable in said cylinder, a rod fixed to said piston and projecting out of said cylinder through the open end thereof, and a body of oil and a gas under pressure in said cylinder, the combination of, a rigid annulus disposed in said cylinder adjacent said open end thereof and encircling said rod, a tubular shell located between said closed end and said rigid annulus and having an outer generally annular end portion abutting said annulus and inner end surrouding said rod with a generally cylindrical wall connecting said outer end portion and inner end, said shell being made of a flexible and resilient material, a first annular portion formed on said outer end portion of said shell adjacent said rod and extending around the entire inner periphery of said outer end portion, said first annular portion resiliently engaging said rod around the entire circumference thereof to form a seal between the shell and the rod, and a second annular portion formed on the exterior of said shell around the entire outer periphery of said outer end portion and engaging the inside of said cylinder around the entire circumference thereof to form a seal between the shell and the cylinder whereby said shell seals the open end of the cylinder, said inner end of said shell normally resiliently engaging said rod around the periphery thereof and said wall of said shell being spaced from said rod whereby the shell and the rod define an annular cavity, said cavity being filled with at least a portion of said body of oil, said wall expanding and contracting in response to differences of the pressures in said cylinder and in said cavity as said piston slides back and forth in the cylinder thereby to pump oil into and out of said cavity between said inner end and said rod and maintain the cavity full of oil, said shell being formed by first and second parts, said first part comprising said first and second annular portions and said end portion and said second part comprising said wall, and means selectively connecting said first and second parts of said shell.

* * * * *